United States Patent [19]

Kirjavainen

[11] Patent Number: 5,387,386
[45] Date of Patent: Feb. 7, 1995

[54] EXTRUSION METHOD AND APPARATUS

[76] Inventor: Kari Kirjavainen, Kivenlahdenkatu 11 A 4, SF-02320 Espoo, Finland

[21] Appl. No.: 61,813

[22] Filed: May 13, 1993

Related U.S. Application Data

[63] Continuation of Ser. No. 613,892, Feb. 4, 1991, abandoned.

[30] Foreign Application Priority Data

Jun. 6, 1988 [FI] Finland ............... 882653

[51] Int. Cl.⁶ .............. B29C 47/80; B29C 47/52
[52] U.S. Cl. .................. 264/173; 264/26; 264/209.2; 264/209.8; 264/211.1; 264/211.23; 264/DIG. 46; 425/131.1; 425/174.8 R; 425/381.2; 425/462; 425/DIG. 13
[58] Field of Search .............. 264/173, 26, 209.1, 264/211.1, 209.2, 209.8, 211.23, DIG. 46; 428/34.2; 425/381, 131.1, 381.2, 174.8 R, 462, DIG. 13

[56] References Cited

U.S. PATENT DOCUMENTS

| | | | |
|---|---|---|---|
| 3,046,603 | 7/1962 | Maxwell | 264/211.1 |
| 3,418,413 | 12/1968 | Henry | 425/381.2 |
| 3,422,177 | 1/1969 | Wallace | 425/381.2 |
| 3,429,003 | 2/1969 | Heider et al. | 425/381.2 |
| 3,490,097 | 1/1970 | Gould | 425/381 |
| 3,689,189 | 9/1972 | Wagner | 425/381.2 |
| 3,832,116 | 8/1974 | Delorme | 425/381.2 |
| 3,957,255 | 5/1976 | Groom | 425/381.2 |
| 4,521,368 | 6/1985 | Mercer et al. | 425/381 |
| 4,553,922 | 11/1985 | Winner | 425/381.2 |

FOREIGN PATENT DOCUMENTS

| | | | |
|---|---|---|---|
| 793796 | 1/1981 | U.S.S.R. | 264/173 |
| WO89/00910 | 2/1989 | WIPO | 264/211.1 |

Primary Examiner—Mathieu D. Vargot
Attorney, Agent, or Firm—Webb Ziesenheim Bruening Logsdon Orkin & Hanson

[57] ABSTRACT

The invention relates to a method for processing extrudable material, especially for the manufacture of a multilayer extrusion product in an extrusion device, wherein the extrudable material is brought in solid form, advantageously as powder or in granular form, and which includes a central extrusion channel (1) and the stator means (2, 3) and the rotor (4) defining it. The invention concerns also such an extrusion device. In the extrusion device according to the invention it is used an optional number of stator and rotor means (2, 3, 4) arranged packlike alternately one within the other, whereby the extrudable material is first melted during its feed into an annular feed defile (5) advantageously in conical or double-conical form between the stator means (2, 3) and the rotor means (4) after the infeed thereof before the central channel, and thereafter compressed to the final extrusion pressure. The feed defile (5) of the extrusion device according to the invention comprises in the flow direction of the extrudable material first an infeed zone (51), then a melting zone (52) and finally a compression zone (53). The invention relates further to a new extrusion product, which is a multilayer product, and at least one layer whereof includes an interlacing orientation field, in which the plastic is helically oriented or directed forming a reinforcing netlike structure into the product.

24 Claims, 2 Drawing Sheets

EXTRUSION METHOD AND APPARATUS

This is a continuation of copending application Ser. No. 07/613,892 filed on Feb. 4, 1991, now abandoned.

BACKGROUND OF THE INVENTION

1. Field of the Invention

The present invention relates in general to extrusion techniques and particularly to a method for processing extrudable material for the manufacture of an extrusion product, advantageously a multilayer extrusion product, by an extrusion device, wherein the extrudable material is brought in solid form, preferably as powder or in granular form, and which comprises a central extrusion channel as well as a stator means and a rotor means defining said channel; and also to an extrusion device for processing the extrudable material to produce an extrusion product, advantageously a multilayer extrusion product, into which extrusion device the extrudable material is brought in solid form, preferably as powder or in granular form, said extrusion device comprising a central extrusion channel as well as a stator means and a rotor means defining said channel. The invention relates also to an extrusion product.

2. Background Art

Traditional extrusion methods can principally be divided into extrusion carried out by so-called axial extruders and the one carried out by so-called radial extruders.

As drawbacks concerning the axial extruders, the benefit of which is a good resistance against pressure load, can be mentioned, that especially for the production of rotationally symmetrical and/or multilayer products many axial extruders must be connected to the extrusion head, whereby dispension of the extrudable mass evenly and homogenously at the extrusion head creates a problem, this being hardly possible or even totally impossible, especially when even minor variations or regulations of the extrudable mass flow amounts occur in the processing, and as a result almost without exception an eccentric and unhomogenous extrusion product is obtained.

A drawback in radial extruders, the benefit of which is a rather good adaptability for production of rotationally symmetrical and multilayer products, is a poor resistance against pressure load, so that the device can only be used for low yields. For higher yields the sizes and dimensions substantially increase, whereby the investment costs of a radial extruder become significantly high compared with the advantages gained.

The main object of the present invention is to provide a new method and extrusion device for processing extrudable material and at the same time to combine the benefits of traditional extrusion techniques and to eliminate the drawbacks relating thereto. The goal and the purpose of the present invention is particularly to enable by the improved method and the new device both the manufacture of multilayer products and the increase of yield as well as variation possibilities of the number of layers in the product.

SUMMARY OF THE INVENTION

These goals have been attained by the method mentioned in the introduction so that an optional number of alternately packlike, one within the other arranged, stator and rotor means is used in the extrusion device, and that the material to be extruded along with the feeding will first be melted in an advantageously conical or double-conical annular feed defile at least partially continuously decreasing in diameter between the stator means and the rotor means, after the infeed at the beginning of the feed defile and before the central extrusion channel, and then compressed to the final extrusion pressure; and by the device mentioned in the introduction so that an optional number of stator and rotor means has been arranged alternately packlike one within the other, and that each feed defile between the stator means and the rotor means has been formed as annular feed defile at least partially continuously decreasing in diameter and advantageously corresponding a conical or double-conical form, comprising in the flow direction of the extrudable material first an input zone, then a melting zone and finally a compression zone ending at the central extrusion channel.

Characteristic to the extrusion product according to the invention is that said product is a multilayer product, and that at least one layer of the product includes an interlacing orientation field, wherein plastic is helically oriented or directed forming a reinforcing netlike structure into the product. Additionally, plastic mixed with fibers and/or polymer forming fibers in the extrusion such as, for example, fluid crystal polymers may be used to form each interlacing orientation field, whereby the fibers or the formation of fiber is directed helically in the rotational direction of the rotor means.

In a preferable embodiment of the method according to the invention the pressure of the extrudable material is continuously increased as it flows in the feed defile, and the extrudable material is inductively melted by an induction conduct or coil in each stator means by heating the stator means defining the feed defile with eddy current principle.

As the most significant advantages of the invention it can be mentioned, that the mechanical strength and resistance against pressure load of the improved extrusion device according to the invention can be compared with the corresponding qualities of an axial extruder, and a remarkable benefit is also, that the final extrusion pressure is not created until at the end of the extrusion device immediately before the central channel before the nozzle. The yield and/or the number of material layers to be formed can almost endlessly be increased just by increasing the number of the stator-rotor-modules to be arranged packlike one within and after the other. Moreover it is possible in the extrusion device according to the invention to realize absolutely evenly distributed central mass distribution, by which an absolutely homogenous and central extrusion product will be obtained as the result.

BRIEF DESCRIPTION OF THE DRAWINGS

The invention will be described in the following by some of its advantageous embodiments with reference to accompanying drawings, wherein.

DESCRIPTION OF THE PREFERRED EMBODIMENT

Figure 1:
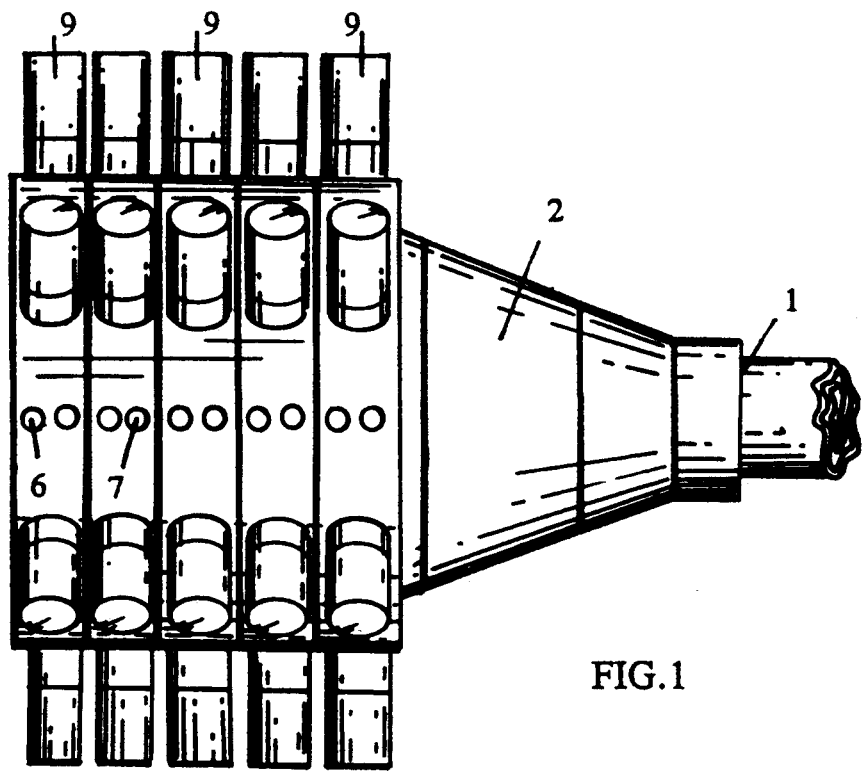
FIG. 1 shows in general an extrusion apparatus according to the invention as seen from above.

The extrusion device shown in FIG. 1 comprises a central extrusion channel, which is peripherally defined 5 from the outside, alternately one within and after the other, into a packlike form, by assembled stator and rotor means 2, 3 and 4. Compactness of the stator-rotor pack has been secured by a bolt-nut joint extending axially through the pack. The material to be extruded into the extrusion device, which will in the following be referred as plastic, is pneumatically fed by a carrier medium, which will in the following be referred as air. The mixture of plastic and air under pressure is conveyed through the infeed opening 6 first to one side of the rotor means 4, from which begins one feed defile 5 for plastic supply defined between the stator and rotor means. After the plastic is fed to the beginning of the feed defile, the air flows through a second discharge opening 7 in the stator means 2, 3 out of the extrusion device.

Figure 4:
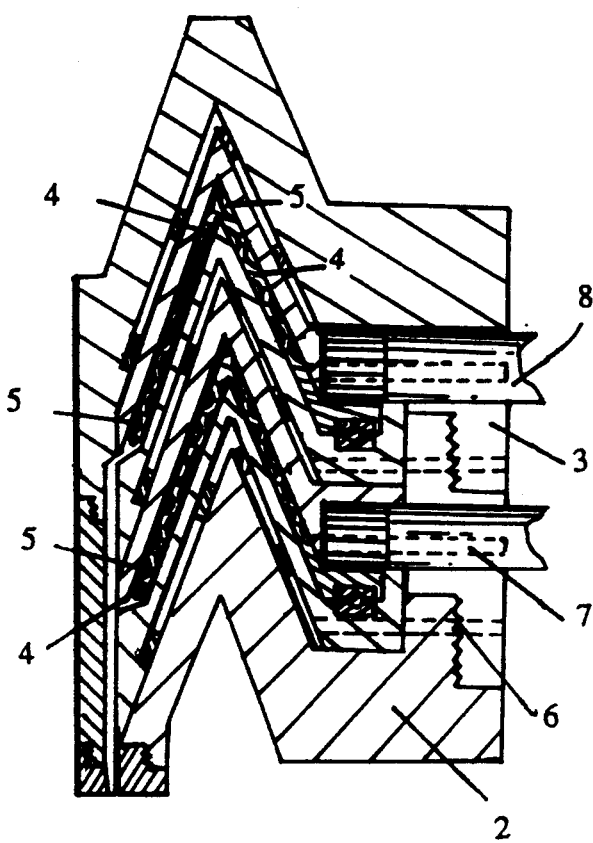
FIG. 4 shows a partial cross-section of the second advantageous embodiment of the invention.
Figure 2:
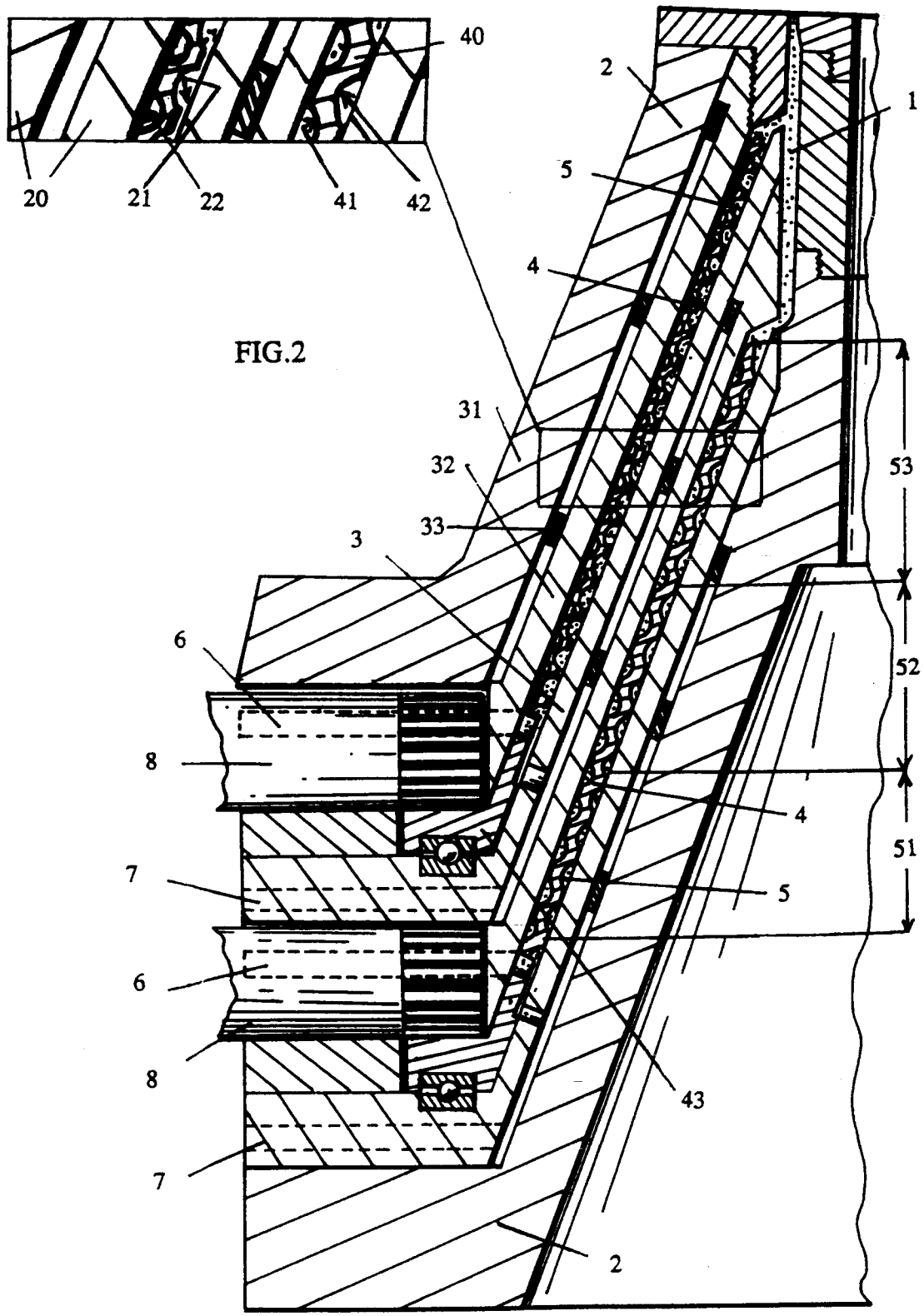
FIG. 2 shows a partial cross-section of the first advantageous embodiment of the invention.

The manner for realization of the rotational drive of each rotor means 4 is not essential to the operation of the invention. In tests an electric motor drive 9 and an hydraulic motor has been used, whereby at least one, advantageously however several mutually symmetrically arranged, at the end toothed power transmission shafts, i.e. drive shafts 8, are connected, as shown in FIG. 2 or 4, with a correspondingly toothed radially extending flangelike extension 43 in the rotor means 4 to rotate the rotor means 4.

As electric motors 9 to drive the rotor means 4 can advantageously be used either parallel connected AC-motors or in series or parallel connected DC-motors, whereby said motors can be controlled by one regulator, advantageously by an inverter regulator, for each extrudable plastic layer. Further it is advisable to provide electric motors 9 with a gear arrangement to generate a suitable rotational speed for the plastic supply. To achieve a compact structure this gear arrangement can be integrated to the frame of the extrusion device or to stationary stator means 2, 3.

As hydraulic motors driving the rotor means 4 of the extrusion device it is advisable to use hydraulic motors with slow rotational motion, whereby there is no need for gears and the transmission shaft of the hydraulic motor operates directly as a driving shaft 8 to rotate the rotor means 4.

To generate an extrudable plastic flow in the annular feed defile 5 defined between the stator means and the rotor means the extrusion device according to the invention is provided with flow generating means, which can be placed:

A) 1) to the side surface 21, 22 of the stator means, or
2) to the side surface 41, 42 of the rotor means, defining the feed defile 5;
B) to the side surface 21, 22 of the stator means and to the side surface 41, 42 of the rotor means, defining the feed defile 5.

According to advantageous embodiments of the invention the flow generating means comprise helical worms, grooves or recesses, which extend as continuous or interrupted formations over the feed defile 5 and form a many-headed and -pitched, e.g. 8-headed and -pitched, formation of helical worms, spiral grooves or spiral recess lines at least at one boundary surface of the feed defile 5.

In the extrusion device according to the first embodiment of the invention shown in FIG. 2 all inner surfaces 21 and outer surfaces 22 of the stator means 2 defining the feed defiles 5 are smooth, while all inner surfaces 41 and outer surfaces 42 of the rotor means 4 defining the feed defiles 5 are provided with flow generating means composed of formations of many-headed helical worms.

To achieve during the plastic flow caused by the flow generating means in each feed defile 5 an advantageously continuously increasing pressure to the plastic, the feed defile 5 has been formed as a ring channel with a continuously decreasing diameter, advantageously in conical (as shown in FIG. 2) or double-conical (as shown in FIG. 4) shape, in which channel plastic during its flow according to the invention is first melted after the infeed and before the central extrusion channel 1, and then preferably just before the central extrusion channel 1 is compressed to the final extrusion pressure. During its flow in the feed defile 5 the pressure of the plastic changes advantageously as follows:

in the feed zone 51 following the infeed the pressure is raised to 3 . . . 7 MPa, advantageously to about 5 MPa, in the melting zone 52 following the feed zone 51 the pressure is raised to 6 . . . 14 MPa, advantageously to about 10 MPa, and in the compression zone 53 following the melting zone 52 before the extrusion channel 1 the pressure is raised to 10 . . . 60 MPa, advantageously between 15 . . . 40 MPa.

To form the continuously decreasing annular feed defile and thus to increase the pressure inside the feed defiles, the diameters of which are continuously decreasing, defined between alternately and one after the other arranged stator and rotor means 2, 3, 4, each stator means 2, 3 has a conically tapering sleeve part 20 and each rotor means 4 has also a conically tapering sleeve part 40. Said conically tapering parts 20 and 40 have been shaped to correspond each other, so that they fit packlike within each other. Moreover, as can be seen in FIGS. 2 and 4, a radially extending flangelike extension 43 is jointed to the larger end of the conically tapering sleeve part 20 of the stator means 2, 3 and respectively of the rotor means 4. Between said extensions has been mounted a thrust bearing enabling the rotational movement of the rotor means 4, whereby the extension 43 of the rotor means is toothed to fit with at least one toothed drive shaft 8 rotating the rotor means 4.

In order to guarantee the mechanical strength of the compact extrusion device according to the invention and at the same time to enable mounting of the means 35 for melting the plastic and also to prevent deformations in the walls defining the feed defile 5 when pressure increases, each stator means 2, 3 includes a first conical element 31 and a second conical element 32 supported with a distance from each other by distance pieces 33, whereby into the intermediate space 34 between the conical elements 31 and 32 have been mounted said means 35 for melting the extrudable material.

Figure 3:
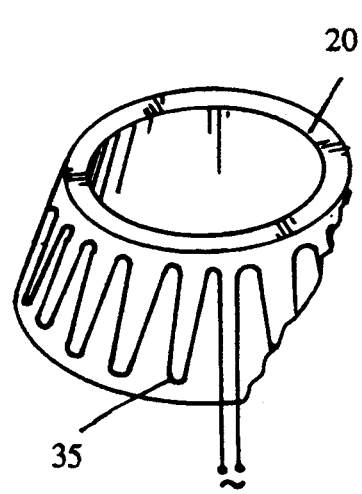
FIG. 3 illustrates one advantageous solution of the arrangement to be used in the extrusion device according to the invention to melt the extrudable material.

In the preferable embodiment of the invention shown in FIG. 3 the means 35 for melting the extrudable material comprise an induction conduct or coil 35 mounted in a wave-like manner into the intermediate space 34 between the conical elements 31 and 32, by which conductor or coil the walls of the stator means 2 and 3 defining the feed defile are heated by the eddy current principle.

The extrusion device according to the second advantageous embodiment of the invention is shown in FIG. 4 and corresponds in its operation with the extrusion device of the first embodiment of the invention and differs only structurally from the first embodiment in the sense that each feed defile 5 for the extrudable material between the stator means 2, 3 and the rotor means 4 forms an angle, whereby each stator means 2, 3 and rotor means 4 are formed by sleeve parts advantageously double-conical in shape and adapted one after and within the other. In this second embodiment the axial component of the extrudable plastic flow at the beginning of the feed defile 5 is opposite compared with the axial component of the extrudable plastic flow at the end of the feed defile 5, whereby the loads directed to the structural parts of the extrusion device by the plastic under pressure partly compensate each other and smaller thrust bearings can be used between the stator means 2, 3 and the rotor means 4.

Especially to even out the plastic supply it is advantageous that the plastic is supplied into the feed defile 5 from several points on the periphery of the rotor means 4, preferably by equal distances from each other, whereby it is possible to eliminate the problems caused by unsymmetrical supply, particularly to avoid the possibility, that the final product would be unsymmetrical and/or unhomogenous.

The invention has been described above only by some of its advantageous embodiments. This is not, of course, meant to limit the invention and as is evident for persons skilled in the art, several modifications, variations and alternatives are possible within the scope of the accompanying claims concerning the construction as well as the infeed, melting and pressurizing of the extrudable material. Especially there is a reason to emphasize, that it is not necessary to form the opposite nested surfaces of rotor and stator means as continuously tapering conical forms, but that said surfaces can have bends, ball surfaces, parabolic surfaces and corresponding shapes, however so, that mounting of the parts in a packlike manner and forming of feed defiles therebetween is realized. It is also possible to supply into feed defiles separated by rotor means, i.e. on both sides of the rotor, different extrudable materials—hence by means of one single rotor between the stator means it will be possible to produce a 2-layer product, and if several modules are mounted one after the other, it is possible to produce extrusion products with high number of layers. In this case the extrusion device must include at least one supply opening for each layer to be extruded and one discharge opening for the carrier material. Further there is a reason to emphasize, that especially to guarantee the homogeneity of the yield and the equal thickness of the layers, it is advantageous that the rotors are rotated in opposite directions, whereby the rotors are rotated in opposite directions in respect to each other in any optional pair of pair of two successive rotors.

I claim:

1. An extrusion device for processing extrudable material, said extrusion device comprising:
   a central extrusion channel for the extrudable material;
   at least two stator means, with each said stator means including a conically tapered portion which tapers in the direction of said central extrusion channel, and a heating means for heating said stator means and thereby heating the material to be extruded, wherein each said stator means includes a first element, and a second element connected to said first element by at least one distance piece, with an intermediate space defined between said first and second elements;
   at least one rotor means rotatably positioned between said stator means, with each said rotor means including a conically tapered portion which tapers in the direction of said central extrusion channel; and
   at least one feed defile positioned between said rotor means and said stator means and coupled to said central extrusion channel, wherein each said feed defile has a diameter which decreases in the direction of said central extrusion channel.

2. The extrusion device of claim 1 wherein each said stator means is at least a two-piece stator means, wherein said heating means is an induction heating means positioned in said intermediate space formed in said at least two-piece stator means to heat said two-piece stator means, and wherein flow generating means are formed on each said rotor means to generate extrudable material flow.

3. The extrusion device of claim 2 wherein said flow generating means include helical recesses formed on side surfaces of each said rotor means.

4. The extrusion device of claim 1 wherein flow generating means are formed on each said stator means to generate extrudable material flow, and said flow generating means include helical recesses formed on side surfaces of each said stator means.

5. An extrusion device for processing extrudable material, said extrusion device comprising:
   a central extrusion channel for the extrudable material;
   at least two stator means, with each said stator means including a conically tapered portion which tapers in the direction of said central extrusion channel;
   at least one rotor means rotatably positioned between said stator means, with each said rotor means including a conically tapered portion which tapers in the direction of said central extrusion channel; and
   at least one feed defile positioned between said rotor means and said stator means and coupled to said central extrusion channel, wherein each said feed defile has a diameter which decreases in the direction of said central extrusion channel;
   wherein each said stator means includes a first element, and a second element connected to said first element by at least one distance piece, with an intermediate space defined between said first and second elements, wherein a heating means is mounted within said intermediate space, and said heating means comprises an induction coil mounted in said intermediate space.

6. The extrusion device of claim 1 wherein at least three of said stator means and at least two of said rotor means are provided, with each said rotor means positioned between two of said stator means, and at least two of said feed defiles provided with each of said rotor means defining at least one of said feed defiles between said rotor means and said stator means.

7. The extrusion device of claim 6 wherein each said rotor means includes a toothed extension coupled to one end of said rotor means.

8. The extrusion device of claim 7 wherein an individual toothed drive shaft cooperates with each said rotor means.

9. The extrusion device of claim 1 wherein each said stator means includes a conically widening portion which widens in the direction of said central extrusion channel which is coupled to said tapered conical portion of said stator means, and each said rotor means includes a conically widening portion which widens in the direction of said central extrusion channel which is coupled to said tapered conical portion of said rotor means.

10. An extrusion device for processing extrudable material, said extrusion device comprising:

a central extrusion channel for the extrudable material;

at least two stator means, with each said stator means including a conically widening portion which widens in the direction of said central extrusion channel coupled to a conically tapered portion which tapers in the direction of said central extrusion channel, wherein each said stator means includes a first element, and a second element connected to said first element by at least one distance piece, with an intermediate space defined between said first and second elements and, wherein each said stator means is at least a two-piece stator means with a heating means positioned in said intermediate space formed in said at least two-piece stator means;

at least one rotor means rotatably positioned between said stator means, with each said rotor means including a conically widening portion which widens in the direction of said central extrusion channel which is coupled to a conically tapered portion which tapers in the direction of said central extrusion channel; and at least one feed defile positioned between said rotor means and said stator means and coupled to said central extrusion channel, wherein each said feed defile has a diameter which decreases in the direction of said central extrusion channel.

11. The extrusion device of claim 10 wherein at least three of said stator means and at least two of said rotor means are provided, with each said rotor means positioned between two of said stator means, and at least two of said feed defiles provided with each of said rotor means defining at least one of said feed defiles between said rotor means and said stator means.

12. The extrusion device of claim 11 wherein flow generating means are formed on each said rotor means to generate extrudable material flow.

13. The extrusion device of claim 12 wherein said flow generating means include helical recesses formed on side surfaces of each said rotor means.

14. An extrusion device for processing extrudable material, said extrusion device comprising:

a central extrusion channel for the extrudable material;

at least two stator means, with each said stator means including a conically widening portion which widens in the direction of said central extrusion channel coupled to a conically tapered portion which tapers in the direction of said central extrusion channel;

at least one rotor means rotatably positioned between said stator means, with each said rotor means including a conically widening portion which widens in the direction of said central extrusion channel which is coupled to a conically tapered portion which tapers in the direction of said central extrusion channel; and at least one feed defile positioned between said rotor means and said stator means and coupled to said central extrusion channel, wherein each said feed defile has a diameter which decreases in the direction of said central extrusion channel, wherein each said stator means includes a first element, and a second element connected to said first element by at least one distance piece, with an intermediate space defined between said first and second elements, wherein a heating means is mounted within said intermediate space.

15. The extrusion device of claim 14 wherein said heating means comprises an induction coil mounted in said intermediate space.

16. A method for processing extrudable material comprising the steps of:

a) feeding extrudable material, which is in solid form and includes plastic mixed with fibers or polymer forming fibers to an extrusion device which includes a central extrusion channel, at least two stator means with each said stator means including a conically tapered portion which tapers in the direction of said central extrusion channel, each said stator means includes a first element, and a second element connected to said first element by at least one distance piece, with an intermediate space defined between said first and second elements, at least one rotor means rotatably positioned between said stator means, with each said rotor means including a conically tapered portion which tapers in the direction of said central extrusion channel, and at least one feed defile positioned between said rotor means and said stator means and coupled to said central extrusion channel, wherein said feed defile has a diameter which decreases in the direction of said central extrusion channel, wherein said extrudable material is supplied into a feeding zone of said feed defile from several equally spaced points about the periphery of said rotor means;

b) melting said extrudable material in a melt zone of said feed defile with a heating means positioned within said intermediate space formed in each said stator means, wherein the pressure is higher within said melt zone than said feed zone;

c) compressing said extrudable material in a compression zone of said feed defile to a final extrusion pressure which is higher than the pressure with said melt zone; and d) extruding said material through said central extrusion channel.

17. An extrusion device for processing extrudable material for forming a multilayer extrusion product, said extrusion device comprising:

at least three stator means and at least two rotor means, each said stator and said rotor means including a conically tapered portion, and said stator and rotor means being assembled alternately one within the other, wherein conically tapered portions of said rotor means are disposed between said conically tapered portions of said stator means;

a plurality of annular tapered feed defiles for melting and compressing the extrudable material, each said feed defile being at least partly conically tapered, said feed defiles have the inlet and outlet ends formed between said conically tapered portions of said stator and rotor means, wherein the diameter of said annular feed defiles decreases in the flow direction of the extrudable material;

at least one feed inlet for solid extrudable material connected to said inlet end of each said annular feed defile;

a central extrusion channel connected to said outlet end of each said annular feed defile; and heating means connected to said stator means for heating and melting the extrudable material flowing in the annular feed defiles before said central extrusion channel.

18. The extrusion device of claim 17 further including flow generating means formed on side surfaces of said stator means.

19. The extrusion device of claim 18 wherein said flow generating means is formed of helical grooves formed on side surfaces of said stator means.

20. The extrusion device of claim 17 further including flow generating means formed on side surfaces of said rotor means.

21. The extrusion device of claim 20 wherein said flow generating means is formed of helical grooves formed on side surfaces of said rotor means.

22. The extrusion device of claim 17 further including flow generating means formed on side surfaces of said rotor and said stator means.

23. The extrusion device of claim 17 wherein said heating means includes an induction coil in each said stator means for heating said stator means.

24. The extrusion device of claim 17 wherein several feed inlets are formed on a periphery of each said annular feed defile at said inlet end.

* * * * *